United States Patent [19]

Kawase et al.

[11] 3,904,578
[45] Sept. 9, 1975

[54] STABILIZED POLYESTER COMPOSITION AND METHOD FOR STABILIZING POLYESTER

[75] Inventors: Shoji Kawase; Hiroo Inata; Takeo Shima, all of Iwakuni, Japan

[73] Assignee: Teijin Limited, Osaka, Japan

[22] Filed: Nov. 21, 1973

[21] Appl. No.: 417,918

[30] Foreign Application Priority Data
Nov. 24, 1972 Japan............................. 47-117095

[52] U.S. Cl.... 260/40 P; 260/45.85 B; 260/45.95 R
[51] Int. Cl................................................. C08g 51/58
[58] Field of Search .... 260/45.85 B, 45.95 R, 75 R, 260/75 T, 40 P

[56] References Cited
UNITED STATES PATENTS

| | | | |
|---|---|---|---|
| 3,285,855 | 11/1966 | Dexter et al. ...................... | 260/45.85 |
| 3,563,949 | 2/1971 | Habeck et al....................... | 260/45.95 |
| 3,594,448 | 7/1971 | Birenzvige et al. ............... | 260/45.95 |
| 3,620,824 | 11/1971 | Slade .................................. | 260/45.95 |
| 3,816,377 | 6/1974 | Okuzumi............................. | 260/75 |

*Primary Examiner*—V. P. Hoke
*Attorney, Agent, or Firm*—Sherman & Shalloway

[57] ABSTRACT

A polyester, at least 80% of the recurring units of which in terms of number, consists of tetramethylene terephthalate units or tetramethylene 2,6-naphthalate units, is stabilized against oxidative degradation by incorporating into it 0.001 to 10% by weight, based on the weight of the polyester, of at least one specified stabilizer compound of the following formulas:

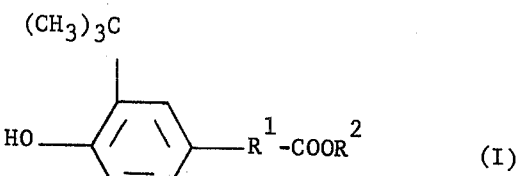

(I)

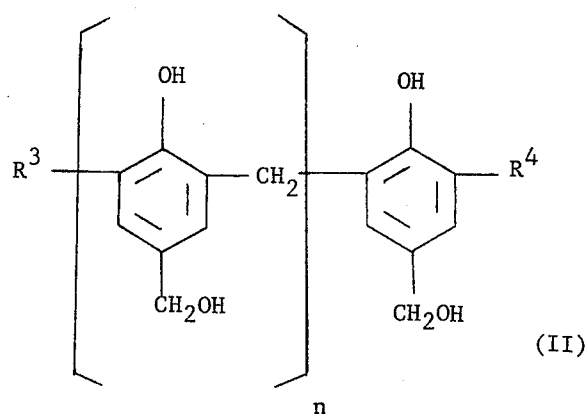

(II)

6 Claims, No Drawings

STABILIZED POLYESTER COMPOSITION AND METHOD FOR STABILIZING POLYESTER

This invention relates to an improved stabilized polyester composition and to an improved method for stabilizing polyesters. More specifically, the invention relates to a stabilized polyester composition having improved oxidation resistance at high temperatures; i.e., a polyester at least 80 % of the recurring units of which, in terms of number, consist of tetramethylene terephthalate units or tetramethylene 2,6-naphthalate units, and to a method for stabilizing such polyesters against oxidation. Furthermore, the invention relates to a stabilized polyester composition which has superior stability against oxidation for prolonged periods of time using a stabilizer with good reproducibility of stabilization, and which does not cause coloration of the polyester but permits an increased rate of crystallization of the polymer in melt-shaping, thereby imparting improved moldability; and to a method for stabilizing polyesters.

It is known that poly(tetramethylene terephthalate) and poly(tetramethylene-2,6-naphthalate) have poor resistance to degradation by oxygen, heat and light but have a high rate of crystallization as compared respectively with poly(ethylene terephthalate) and poly(ethylene-2,6-naphthalate). According to this invention, not only is superior resistance to degradation imparted, but also a greater rate of crystallization which is in itself irrelevant to the effect of stabilization can be achieved.

Various stabilizers for synthetic polymeric materials including polyesters have been proposed. However, only a very few of them are in actual commercial use because these stabilizers are required not only to exhibit superior stabilizing effects, but also to maintain the stabilizing effects for prolonged periods of time with good reproducibility of the stabilization effects, not to affect the physical properties of the polymeric materials adversely nor to color the polymers, and also to be easy to produce and be available at low cost and with ease.

Previously, dialkylhydroxyphenylalkanoic acid esters of di- and tri-pentaerythritol expressed by the following formula (i)

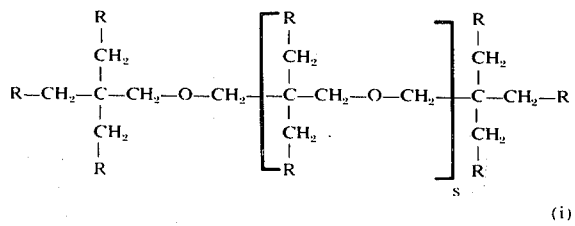

wherein, $s$ has a value of zero or 1 and each R is a group having the following structure

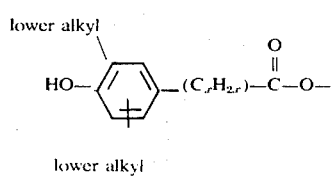

wherein $x$ is 1 to 6,
were proposed as stabilizers for polyesters such as poly- methylene terephthalate, vinyl resins, polyolefins, polyurethanes, polyamides, animal oils and vegetable oils (U.S. Pat. No. 3,642,868).

The above compounds are produced by reacting di- or tri-pentaerythritol with a compound of the formula (ii)

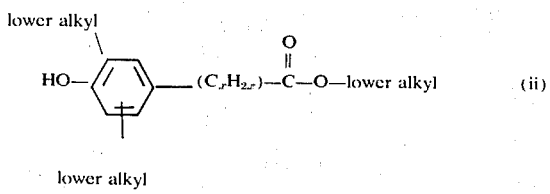

in the presence of a hydride or lower alkoxide of an alkaline metal.

It has now been found that compounds of formula (I) or (II)

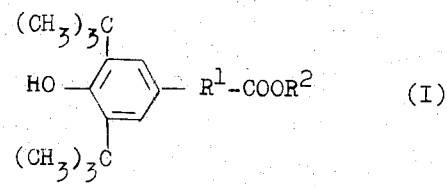

wherein $R^1$ is a divalent organic group, and $R^2$ is an alkyl group or aryl group,

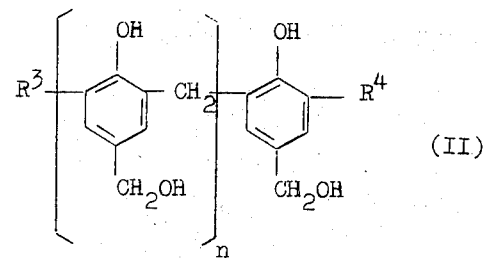

$R^3$ and $R^4$ are the same or different alkyl groups having at least 4 carbon atoms, and $n$ is 1 or 2, which can be produced with ease and at low cost and which include the compounds of the formula (ii) cited above impart superior feasible stabilizing effects and an increased rate of crystallization to a polyester at least 80 % of the recurring units of which in terms of number consist of tetramethylene terephthalate units or tetramethylene 2,6-naphthalate units.

Various other compounds having a hindered phenol group or an analogous group are known as stabilizers for polymers.

For example, U.S. Pat. No. 3,644,482 discloses compounds of the following formula

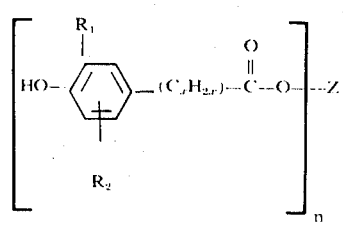

wherein $R_1$ is $-CH_3$, $-C_2H_5$ or α-branched alkyl of $C_3 \sim C_{10}$, $R_2$ is H, $-CH_3$, $-C_2H_5$ or α-branched alkyl of $C_3 \sim C_{10}$, $x = 1 \sim 6$, $n = 2 \sim 6$ and Z is an aliphatic hydrocarbon of the formula $C_yH_{2y+2+n}$, in which $y = 2 \sim 18$ when $n = 2$ and $y = 3 \sim 6$ when $n > 2$, such that $y \geq n$.

Furthermore German Offenlegungsschrift No. 2,150,327 discloses a mixture of compounds expressed by the following two formulae

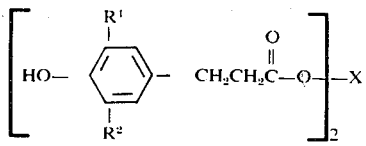 and 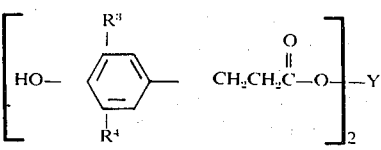

wherein $R^1$ and $R^2$ are, independently, methyl, isopropyl, sec.butyl or tert.butyl; $R^3$ and $R^4$ are, independently, isopropyl, sec.butyl or tert.butyl; and X and Y are dissimilar $C_3 - C_{18}$ alkylene groups which have two non-geminal valency bonds.

Furthermore, German Offenlegungsschrift No. 2,158,014 and No. 2,158,015 disclose the conjoint use of a compound of the following formula

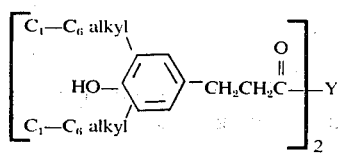

wherein Y is

$-NH-(C_mH_{2m})-NH-$ or

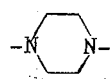

or a compound of the following formula

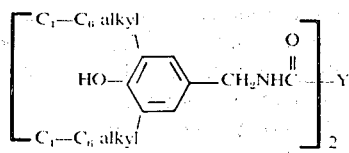

wherein Y' is alkylene of $C_1 - C_{10}$ or $-C_2H_4-S-C_2H_4-$, and a hypophosphite of IA, IIA or IIB metal, and also the conjoint use of a compound of the following formula

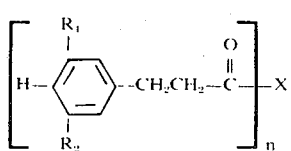

wherein $R_1$ is H or alkyl of $C_1 - C_5$, $R_2$ is alkyl of $C_1 - C_5$, X is

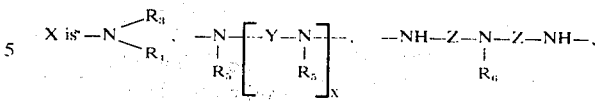

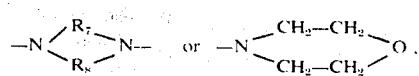

and $n = 1 \sim 3$, and a phosphorus-containing compound as a stabilizer for polyamides.

Furthermore, U.S. Pat. No. 3,681,431, Dutch Laid-Open Publication No. 72.09214 and Dutch Laid-Open Publication No. 72.09230 propose compounds having a hindered phenol group.

According to this invention, the superior feasible stabilizing effect and the effect of increasing the rate of crystallization of polymer can both be achieved by using at least one of the compounds of the formulae (I) and (II) above which can be produced with relative ease as compared with the compounds disclosed in the prior art references cited above.

An object of this invention is to provide a stabilized polyester composition of improved stability against degradation and an increased rate of crystallization comprising a polyester at least 80 % of whose recurring structural units in terms of number consist of tetramethylene terephthalate units or tetramethylene 2,6-naphthalate units.

Another object of this invention is to provide a method for stabilizing a polyester in order to furnish such a composition.

Many other objects of this invention along with its advantages will become clearer from the following description.

The stabilized polyester composition of this invention comprises a polyester at least 80 %, preferably at least 90 % of whose recurring units in terms of number consist of tetramethylene terephthalate units or tetramethylene 2,6-naphthalate units, and 0.001 to 10 % by weight, preferably 0.001 to 5 % by weight, based on the weight of the polyester, of at least one compound selected from the group consisting of the compounds of the formulae (I) and (II) hereinabove, and may optionally contain an additive such as an ultraviolet inhibitor, a coloring agent, a fluorescent brightening agent and a filler.

The composition of this invention may be solid molding composition in various forms such as molding powder, granule, pellet or flake, or in the form of a melt-shaped article such as fibers or films prepared by melt-shaping this composition.

The polyester used in this invention can be prepared by any known method using a dicarboxylic acid component at least 80 mol%, preferably at least 90 mol%, of which consists of terephthalic acid, naphthalene-2,6-dicarboxylic acid or its polyester-forming derivative, and a glycol component at least 80 mol%, preferably at least 90 mol% of which consists of tetramethylene glycol or its polyester-forming derivative. For example, an alkyl ester of the above-mentioned dicarboxylic acid is reacted with the glycol by heating in the presence of an ester-interchange reaction catalyst such as tetraalkyl titanate or calcium acetate, and heating the resulting glycol ester in the presence of a polycondensation reaction catalyst such as a tetraalkyl titanate.

Examples of the other dicarboxylic acid component to be used in an amount of not more than 20 mol%, preferably not more than 10 mol% are naphthalene-2,6-dicarboxylic acid (when the main component is terephthalic acid), terephthalic acid (when the main component is naphthalene-2,6-dicarboxylic acid), isophthalic acid, naphthalene-2,7-dicarboxylic acid, naphthalene-1,5-dicarboxylic acid, 4,4'-diphenyldicarboxylic acid, 4,4'-diphenoxyethanedicarboxylic acid, p-hydroxybenzoic acid, sebacic acid, and adipic acid. Examples of the other glycol component to be used in an amount of not more than 20 mol%, preferably not more than 10 mol% are alkylene glycol or cycloalkylene glycol, such as ethylene glycol, trimethylene glycol, hexamethylene glycol, decamethylene glycol, cyclohexanedimethylol, and neopentylene glycol.

According to the stabilizing method of this invention, at least one of the compounds of formulae (I) and (II) is incorporated into a polyester at least 80 %, preferably at least 90 mol%, of whose recurring units in terms of number consist of tetramethylene terephthalate units or tetramethylene 2,6-naphthalate units in an amount of 0.001 to 10 % by weight, preferably 0.001 to 5 % by weight, especially 0.005 to 1 % by weight, based on the weight of the polyester, at any desired step before the completion of the melt-shaping of the polyester. The time of incorporation may be any time before the completion of the melt-shaping of the polyester. For example, such a compound may be added to the charge stock for forming the polyster, or may be added at the start, during, or after the reaction of forming the polyester. Or the compound may be added to the resulting polyester at any time before it is used for melt-shaping.

Preferred compounds of the formulae (I) and (II) are those of formula (I) in which $R^1$ is an alkylene group having 1 to 5 carbon atoms, a cycloalkylene group having 6 to 12 carbon atoms, a xylylene group, a phenylene group, an oxyalkylene group —O—(CH$_2$)$_m$—, in which $m$ is an integer of 1 to 6, an oxyarylene group

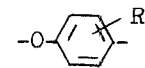

wherein R is a hydrogen atom, a halogen atom, a nitro group of an alkyl group having 1 to 4 carbon atoms,

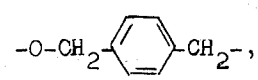

—S—(CH$_2$)$_l$—, in which $l$ is an integer of 1 to 6 and group

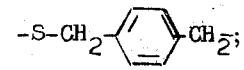

$R^2$ is an alkyl group having 1 to 20 carbon atoms, a phenyl group, a phenyl group substituted with an alkyl group having 1 to 4 carbon atoms, an alkoxy group having 1 to 4 carbon atoms or a hydroxyl group, or a naphthyl group; and those of formula (II) in which $R^3$ and $R^4$ are the same or different alkyl groups having 4 to 20 carbon atoms.

Specific examples of the compounds of formulae (I) and (II) are as follows:

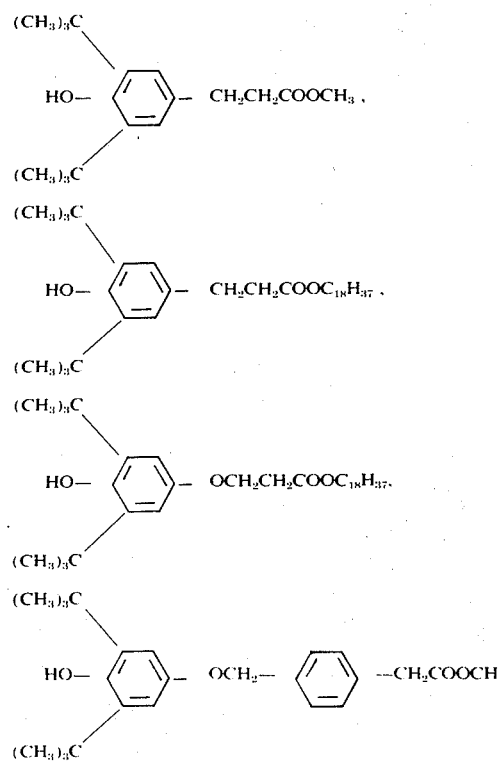

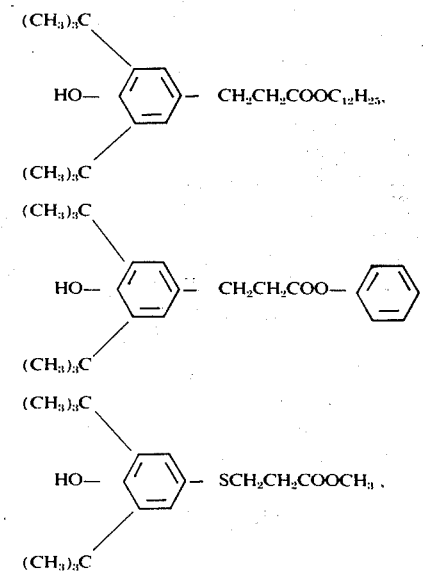

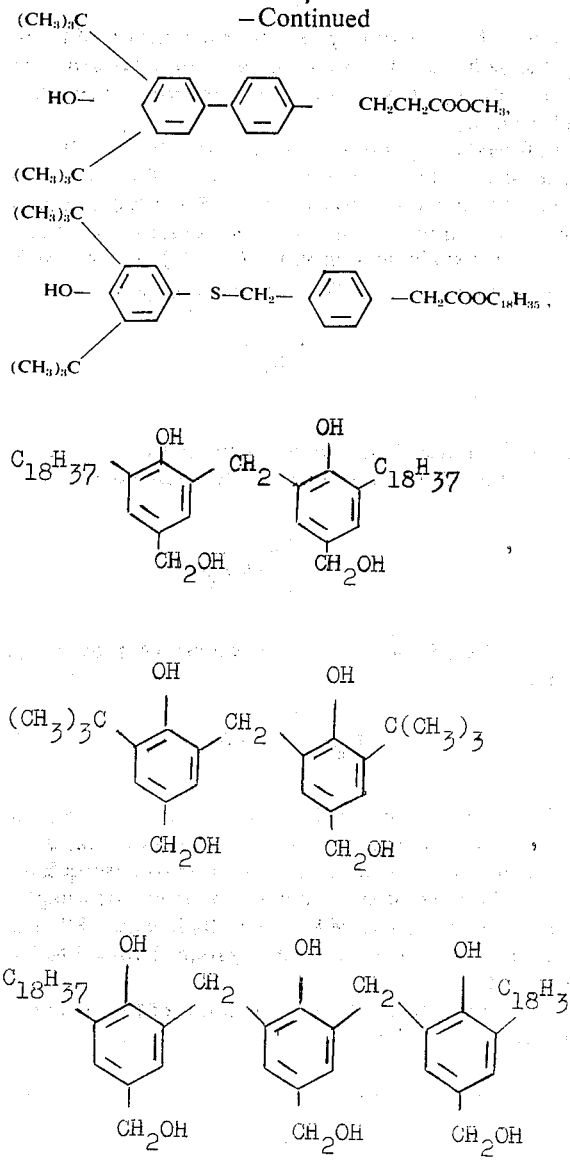

The composition of this invention may further contain various additives such as a stabilizer, cooling agent, fire retardant, fluorescent bleaching agent, mold releasing agent, nucleating agent, lubricant, filler or blowing agent.

The stabilizer may, for example, be a light stabilizer or heat stabilizer. Specific examples of the light stabilizer are benzotriazole compounds such as 2-hydroxy-3-chloro-5-t-butylbenzotriazole, benzophenone compounds such as 2,4-dihydroxybenzophenone, and phenyl salicylate-type compounds such as phenyl salicylate. Examples of the heat stabilizer include sulfur compounds such as dilauryl thiopolypronate, and phosphorus compounds such as phosphoric acid, phosphorous acid, phosphinic acid, phosphonic acid or esters of these.

The coloring agent may be any desired dye or pigment.

Examples of the fire retardant are halogen-containing aromatic compounds such as hexabromobenzene, an oligomeric polycarbonate of tetrabromobisphenol A, decabromobiphenyl, decabromobiphenyl ether, or tetrabromophthalic anhydride, and phosphorus compounds such as tris(2,3,-dibromopropyl phosphate) or polyaryl phosphenates. The retardant may be used conjointly with an assistant such as antimony trioxide.

One example of the mold releasing agent is silicone.

Examples of the lubricant are barium stearate, calcium stearate, and liquid paraffin.

The nucleating agent may, for example, be an inorganic nucleating agent such as talc, an organic nucleating agent such as benbzophenone, or a salt such as sodium terephthalate.

The filler includes, for example, glass fibers, carbon fibers, asbestos, or rock wool. The incorporation of these fillers is preferred because they give rise to a greater improvement in the mechanical characteristics, resistance to thermal deformation and fire retardance of the composition of this invention.

Preferably, the amounts of these additives are as follows based on the weight of the polyester: not more than 5 % by weight of the stabilizer; not more than 30 % by weight of the fire retardant (as a total amount, when an assistant is used); 0.05 to 5 % by weight of the mold releasing agent; 0.01 to 5 % by weight of the nucleating agent; 0.01 to 5 % by weight of the lubricant; 1 to 50 % by weight of the filler. The amount of the coloring agent is usually 0.01 to 5 % by weight based on the weight of the polyester.

The following Examples illustrate the present invention in greater detail. In the Examples, all parts are parts by weight, and [η] represents the intrinsic viscosity of the polymer measured in ortho-chlorophenol at 35°C. The [COOH] represents the molar equivalent of the carboxyl groups per $10^6$ of polymer. The rate of crystallization is measured as follows: Chips of polymer having an average diameter of about 0.5 to 1 mm are dried and then melted at 270°C. for 3 minutes, followed by quenching by being dipped ina bath at a temperature of 150°C. for a predetermined period of time. The specific gravity of the sample is measured. The time required until the specific gravity reaches a value intermediate between the specific gravity of the amorphous sample and that of the sample whose crystallization reaches an equilibrium is expressed by seconds. The smaller the figure showing the time in seconds, the faster is the rate of crystallization.

EXAMPLE 1 AND COMPARATIVE EXAMPLE 1

A reactor equipped with a distillation column was charged with 64.7 parts of dimethyl terephthalate, 69.0 parts of tetramethylene glycol and 0.023 part of tetrabutyl titanate, and heated at 150° to 220°C. for 60 minutes. Methanol in an almost theoretical amount was distilled off. The ester interchange reaction product was transferred to a polycondensation reaction vessel. While raising the temperature, the pressure in the reactor was gradually reduced until finally the pressure reached about 0.5 mm Hg absolute. Then, with stirring, the product was polycondensed for 150 minutes. Then, in a nitrogen atmosphere at atmospheric pressure, 0.073 parts (0.1 % by weight based on the weight of the polyester) of stearyl 3(3′,5′-di-t-butyl-4-hydroxyphenyl) propionate was added. The resulting polyester had an [η] of 1.14 and a [COOH] of 27. The rate of crystallization of this polymer was 5 seconds.

For comparison, the above procedure was repeated except that the stearyl 2(3′,5′-di-t-butyl-4′-hydroxyphenyl) propionate was not added, thereby to obtain polyester having an [η] of 1.13, a [COOH] of 24, and a rate of crystallization of 19 seconds.

Each of these polyesters was pulverized to a particle size of 10 to 15 mesh, and exposed for a predetermined period of time in air at 170°C. The results are shown in Table 1.

Table 1

| Run | Properties | Initially (with stabilizer) | After 2 days | After 7 days | After 21 days |
|---|---|---|---|---|---|
| Example 1 | [η] | 1.14 | 1.13 | 1.09 | 1.02 |
|  | [COOH] | 27 | 29 | 33 | 44 |
| Comparative Example 1 | [η] | 1.13 | 0.91 | 0.79 | 0.58 |
|  | [COOH] | 24 | 42 | 93 | 205 |

EXAMPLES 2 to 9 AND COMPARATIVE EXAMPLES 2 and 3

The procedure of Example 1 was repeated except that each of the stabilizing compounds shown in Table 2 was used in the amount indicated. The results are shown in Table 2. For comparison, known stabilizers were used, and the results are also shown in Table 2. The amounts indicated are based on the weight of the polyester.

Table 2

| Run No. | Stabilizers Type | Amount (wt%) | Polyester |
|---|---|---|---|
| Control | (None) | — | tetramethylene terephthalate |
| Ex. 2 | 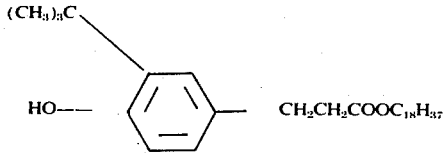 $(CH_3)_3C$ / HO—⟨phenyl⟩—$CH_2CH_2COOC_{18}H_{37}$ / $(CH_3)_3C$ | 0.02 | do. |
| Comp. Ex. 2 | $(CH_3)_3C$ / HO—⟨phenyl⟩—$CH_3$ | 0.1 | do. |
| Ex. 3 | $(CH_3)_3C$ / HO—⟨phenyl⟩—$CH_2CH_2COOCH_3$ / $(CH_3)_3C$ | 0.1 | do. |
| Ex. 4 | $(CH_3)_3C$ / HO—⟨phenyl⟩—$CH_2CH_2COO$—⟨phenyl⟩ / $(CH_3)_3C$ | 0.05 | do. |
| Ex. 5 | $(CH_3)_3C$ / HO—⟨phenyl⟩—$CH_2CH_2COOC_{12}H_{25}$ / $(CH_3)_3C$ | 0.05 | do. |
| Ex. 6 | $H_{37}C_{18}$—⟨phenyl-OH⟩—$CH_2$—⟨phenyl-OH⟩—$C_{18}H_{37}$ | 0.1 | do. |

Table 2 — Continued

| Run No. | Stabilizers Type | Amount (wt%) | Polyester |
|---|---|---|---|
| Ex. 7 | $H_{25}C_{12}$—[phenyl with OH, $CH_2OH$, $CH_2OH$]—$CH_2$—[phenyl with OH, $CH_2OH$, $CH_2OH$]—$C_{12}H_{25}$ | 0.1 | do. |
| Ex. 8 | $H_{37}C_{18}$—[phenyl with OH, $CH_2OH$]—$CH_2$—[phenyl with OH, $CH_2OH$]—$CH_2$—[phenyl with OH, $CH_2OH$]—$C_{18}H_{37}$ | | |
| Ex. 9 | tert.$C_3H_7$—[phenyl with OH, $CH_2OH$]—$CH_2$—[phenyl with OH, $CH_2OH$]—tert.$C_3H_7$ | 0.05 | do. |
| Comp. Ex. 3 | tert.$C_3H_7$—[phenyl with HO, tert.$C_3H_7$]—$CH_2$—[phenyl with OH, tert.$C_3H_7$]—tert.$C_3H_7$ | 0.1 | do. |

| Run No. | | Change with time Initially (with stabilizer) | After 7 days | After 21 days | Rate of crystallization (with stabilizer) (seconds) |
|---|---|---|---|---|---|
| Control | $[\eta]$ | 1.13 | 0.79 | 0.58 | 19 |
| | [COOH] | 24 | 98 | 205 | |
| Exp. 2 | $[\eta]$ | 1.14 | 1.06 | 0.92 | 10 |
| | [COOH] | 22 | 31 | 55 | |
| Comp. Ex. 2 | $[\eta]$ | 1.11 | 0.83 | 0.62 | 15 |
| | [COOH] | 28 | 80 | 205 | |
| Ex. 3 | $[\eta]$ | 1.09 | 0.95 | 0.90 | 4 |
| | [COOH] | 17 | 24 | 41 | |
| Ex. 4 | $[\eta]$ | 1.12 | 1.07 | 0.93 | 9 |
| | [COOH] | 21 | 29 | 49 | |
| Ex. 5 | $[\eta]$ | 1.15 | 1.09 | 1.00 | 7 |
| | [COOH] | 22 | 30 | 42 | |
| Ex. 6 | $[\eta]$ | 1.15 | 1.04 | 1.00 | 5 |
| | [COOH] | 26 | 31 | 42 | |
| Ex. 7 | $[\eta]$ | 1.13 | 1.05 | 0.93 | 7 |
| | [COOH] | 16 | 30 | 45 | |
| Ex. 8 | $[\eta]$ | 1.17 | 1.03 | 9.98 | 5 |
| | [COOH] | 25 | 33 | 47 | |
| Ex. 9 | $[\eta]$ | 1.09 | 1.01 | 0.91 | 8 |
| | [COOH] | 18 | 30 | 42 | |
| Comp. Ex. 3 | $[\eta]$ | 1.17 | 0.86 | 0.65 | 8 |
| | [COOH] | 24 | 79 | 194 | |

EXAMPLE 10 AND COMPARATIVE EXAMPLE 4

A reactor equipped with a distillation column was charged with 73.2 parts of dimethyl 2,6-naphthalene dicarboxylate, 40.5 parts of tetramethylene glycol, 0.02 parts of tetrabutyl titanate and 0.08 parts of bis(2-hydroxy-5-hydroxymethyl-3-stearylphenyl) methane, and heated at 150° to 220°C. for 60 minutes. An almost theoretical amount of methanol was distilled off. Then, the ester interchange reaction product was transferred to a polycondensation reaction vessel, and while raising the temperature to 260° C., the pressure was gradually reduced until finally the pressure reached about 0.5 mmHg absolute. The polycondensation of the product was performed for 90 minutes. The polyester obtained has an $[\eta]$ of 0.82 and a [COOH] of 17.

For comparison, the above procedure was repeated except that the bis(2-hydroxy-5-hydroxymethyl-3-stearylphenyl) methane was not added.

Each of these polymers was pulverized to a particle size of 10 to 15 mesh, and exposed in air at 200°C. for a predetermined period of time. The results are shown in Table 3.

Table 3

| Run | Properties | Initially (with stabilizer) | After 7 days | After 21 days |
|---|---|---|---|---|
| Example 10 | $[\eta]$ | 0.82 | 0.80 | 0.75 |
| | [COOH] | 17 | 25 | 31 |
| Comparative Example 4 | $[\eta]$ | 0.80 | 0.72 | 0.63 |
| | [COOH] | 16 | 33 | 52 |

What we claim is:

1. A stabilized polyester composition comprising a polyester at least 80 % of the recurring units of which in terms of number, consist of tetramethylene terephthalate units of tetramethylene 2,6-naphthalate units, and 0.001 to 10 % by weight, based on the weight of said polyester, of at least one compound selected from the group consisting of compounds of the formula

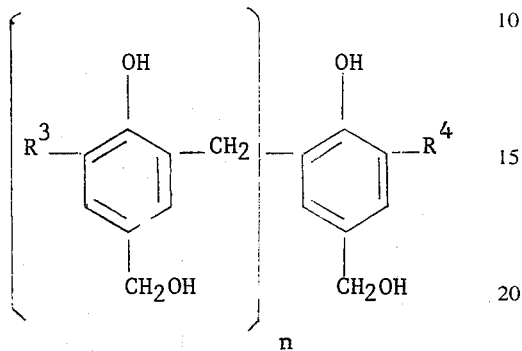

wherein $R^3$ and $R^4$ are the same or different and each represent an alkyl group, and $n$ is an integer of 1 or 2.

2. The composition of claim 1 wherein said composition further contains an additive selected from the group consisting of an ultraviolet ray inhibitor, coloring agent, fluorescent bleaching agent and filler.

3. The composition of claim 1 which is in the form of a molding solid composition or a melt-shaped article.

4. The composition of claim 1 wherein in formula $R^3$ and $R^4$ are the same or different alkyl groups having 4 to 20 carbon atoms.

5. A method for stabilizing a polyester, which comprises incorporating into a polyester at least 80 % of the recurring units of which, in terms of number, consist of tetramethylene terephthalate units or tetramethylene 2,6-naphthalate units and 0.001 to 10 % by weight, based on the weight of said polyester, of at least one compound selected from the group consisting of the compounds of the formula

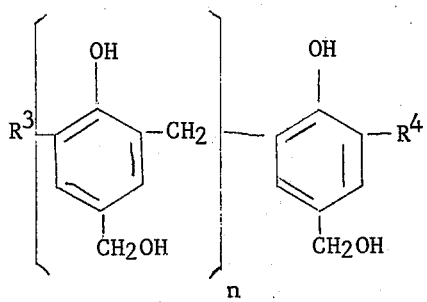

wherein $R^3$ and $R^4$ are the same or different and each represent an alkyl group, and $n$ is an integer of 1 or 2, at any stage before the melt-shaping of the composition.

6. The method of claim 5 wherein $R^3$ and $R^4$ are the same or different alkyl groups having 4 to 20 carbon atoms.

* * * * *